United States Patent [19]
Yoshida

[11] Patent Number: 5,481,101
[45] Date of Patent: Jan. 2, 1996

[54] TWO DIMENSIONAL CODE DATA READING APPARATUS AND METHOD

[75] Inventor: Hirokazu Yoshida, Osaka, Japan

[73] Assignee: Teiryo Sangyo Co., Ltd., Osaka, Japan

[21] Appl. No.: 164,941

[22] Filed: Dec. 10, 1993

[51] Int. Cl.[6] .................................................. G06K 7/10
[52] U.S. Cl. ........................... 235/472; 235/470; 235/473
[58] Field of Search .................................... 235/456, 461,
235/473, 472, 470, 473, 462; 382/58, 67,
68, 313; 358/473, 484, 494, 497, 901.1

[56] References Cited

U.S. PATENT DOCUMENTS

| | | | |
|---|---|---|---|
| 3,739,095 | 6/1975 | Alden | 358/484 |
| 4,402,017 | 8/1983 | Takei | 358/484 |
| 4,559,564 | 12/1985 | Itoh et al. | 358/484 |
| 4,877,949 | 10/1989 | Danielson et al. | 235/472 |
| 5,089,902 | 2/1992 | Tsubota | 358/497 |
| 5,126,544 | 6/1992 | Izumi | 235/456 |
| 5,128,526 | 7/1992 | Yoshida . | |

FOREIGN PATENT DOCUMENTS

| | | | |
|---|---|---|---|
| 58-175356 | 10/1983 | Japan | 382/67 |
| 63-115288 | 5/1988 | Japan | 382/58 |
| 92/16909 | 10/1992 | WIPO | 235/473 |

OTHER PUBLICATIONS

Asano et al., Kbooks Series 86, 1992 pp. 184–187, 192–193.

Primary Examiner—Donald T. Hajec
Assistant Examiner—Karl D. Frech

[57] ABSTRACT

To simplify a data reading apparatus for two-dimensional code data, a line sensor detection unit (30) for reading two-dimensional data includes an optical fiber band cable (3) bundling multiple optical fibers (31) of specified diameter in a band, and an upper end of the fibers is connected to a line sensor element (2) unit incorporated in the reading apparatus (S), and a lower end of the fibers is disposed opposite to an opening (11) of a specified size in the region of one or more two-dimensional code data in the bottom of the reading apparatus (S). The line sensor detection unit (3) including the optical fiber band cable (3) is disposed reciprocally parallel along the surface to be detected in an orthogonal direction, and the line sensor detection unit (30) is set movable within the range of the opening (11). A detection unit moving device (4) is disposed so as to read the two-dimensional code data. As a result, recorded two-dimensional code data can be read by a line sensor for reading one-dimensional data, so that high reading precision can be maintained and the product cost of the reading apparatus of the two-dimensional data can be reduced.

13 Claims, 6 Drawing Sheets

TWO DIMENSIONAL CODE DATA READING APPARATUS AND METHOD

TECHNICAL FIELD OF THE INVENTION

The present invention relates to a two-dimensional code data reading apparatus and method for example, for reading two-dimensional information recorded in an information recording code of a two-dimensional code recorded in two dimensions like a matrix code composing the data region in a matrix or a stack code composing bar codes in multiple layers.

BACKGROUND OF THE INVENTION

As a reading apparatus of a two-dimensional code, scanning laser light vertically and laterally by a reflector or the like to move the detecting position two-dimensionally, and reading out a substantially two-dimensional code data is known. In such an apparatus, however, because of the structure of scanning the reflector at high speed, problems occur in maintenance and precision.

Also a reading apparatus of a two-dimensional code data may take a paper recording two-dimensional code data with a camera, and read the area. However, due to a peripheral error of the camera or if the reading diagonal angle is not at a right angle to the recorded two-dimensional code, an optical error occurs in image processing. The correction algorithm for image processing of the two-dimensional code data is complicated, and the memory capacity for image processing is increased, thereby increasing the price of the reading apparatus.

Accordingly, by using a line sensor and moving the detecting position so that the relative moving direction of the two-dimensional code data and the line sensor may be in the orthogonal direction, optical errors due to the camera may be solved. As shown in FIG. 8, when processing the image of two-dimensional code data by optical means M such as a lens and mirror, since the distances of optical ray paths $L_1$ and $L_2$ are not equal to each other, a constitution may be considered to vary the positional relation of the detection ray from the paper A recording two-dimensional code data and the incident ray to a line sensor element 1.

That is, since the optical detection angle varies, when the total length of the detection ray and incident ray to the sensor element varies depending on the optical means M, a difference is caused between the distance of ray path $L_1$ and distance of ray path $L_2$, thereby producing a difference between the distance of ray path $L_1$ and distance of ray path $L_2$ of the data region, and therefore the size and width of the data region are no longer uniform, which requires correction of data of the two-dimensional data code entering the memory for image processing.

The invention is intended to solve the problems in maintenance and precision in the method of reading two-dimensional data and performing image processing of two-dimensional code data by a simple algorithm, by moving the detecting position so that the relative moving direction of the paper recording the two-dimensional code data and a line sensor is in the orthogonal direction, and entering the image data in the memory in two dimensions.

SUMMARY OF THE INVENTION

It is hence a primary object of the invention to present a two-dimensional code data recording apparatus and method for reading two-dimensional code data such as a matrix code including a data region in matrix form or a stack code including bar codes in multiple layers, wherein a line sensor detection unit for reading the two-dimensional code data includes as an optical fiber band cable having multiple optical fibers with a specified diameter joined in a band form, one end side thereof is connected to a line sensor element unit incoporated in the reading apparatus, while the other end side is disposed against an opening of a specified size in the reading apparatus. The line sensor detection unit of optical fiber band cable is disposed so as to be free to move reciprocally parallel along a surface to be detected in its orthogonal direction, and a detection unit moving device is disposed so as to move the line sensor detection unit within the range of the opening and to read the two-dimensional code data, whereby the recording data of two-dimensional code data can be read two-dimensionally by using a line sensor for reading one-dimensional data.

In another embodiment of the invention, the lower end portion of a optical fiber band cable of the line sensor detection unit is fixed by a fiber support, the fiber support is fitted into a sliding guide, and the detection unit moving device is disposed so that the line sensor detection unit may move reciprocally in the opening of the bottom of the reading apparatus along the sliding guide, whereby the two-dimensional code data can be read securely and precisely.

In another embodiment of the invention, a lighting device is disposed in the reading apparatus, and the surface to be detected by the line sensor detection unit is illuminated by the lighting device, so that the surface to be detected is lit with a uniform illumination, thereby eliminating reading errors.

In another embodiment of the invention, a light emitting diode is disposed on a peripheral edge of the opening of the reading apparatus, so that the reading position and reading range of the reading apparatus may be indicated and clearly read.

In another embodiment of the invention, an interval of optical fibers of the optical fiber band cable of the line sensor detection unit is read as the distance of dividing an interval of data regions of the two-dimensional code by a specific number, so that the two-dimensional code data may be promptly and securely read by a one-dimensional line sensor.

The present invention will become more fully understood from the detailed description given hereinbelow and the accompanying drawings which are given by way of illustration only, and thus are not limitative of the present invention, and wherein:

Figure 1:
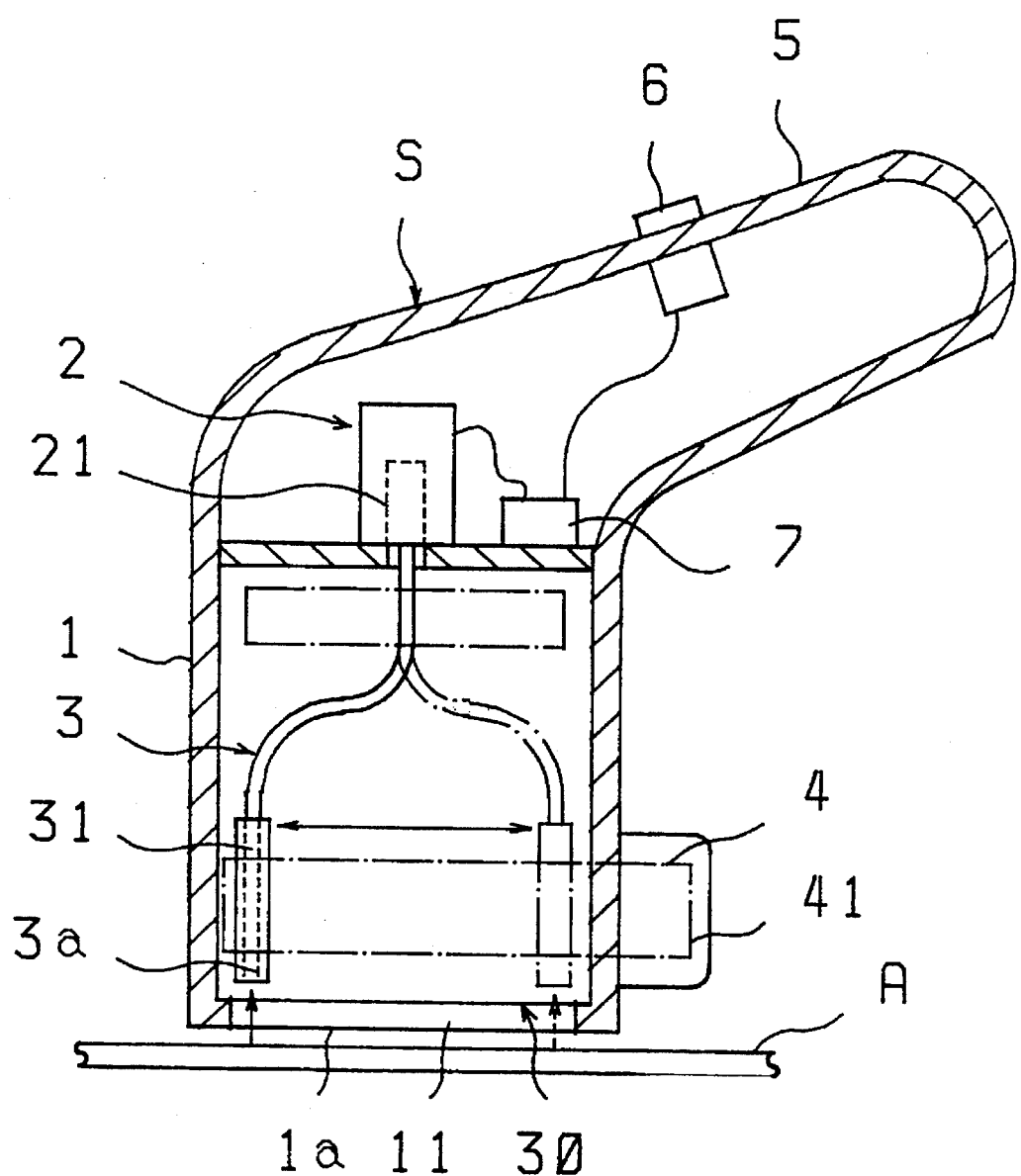
FIG. 1 is a longitudinal sectional view of a reading apparatus of two-dimensional code data showing an embodiment of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The preferred embodiments of the invention are described in detail below, with regard to FIGS. 1 through FIG. 6. In FIGS. 1 through FIG. 4, a two-dimensional code data reading apparatus S is a hand-held portable scanner, in which numeral 1 denotes a box-shaped case, including an opening 11 of a specified size capable of reading one or more two-dimensional code data is provided at a bottom 1a. Numeral 2 shows a line sensor element unit, and multiple sensor elements 21 of a CCD are arranged in vertical rows in the upper half of the case 1.

Figure 3:
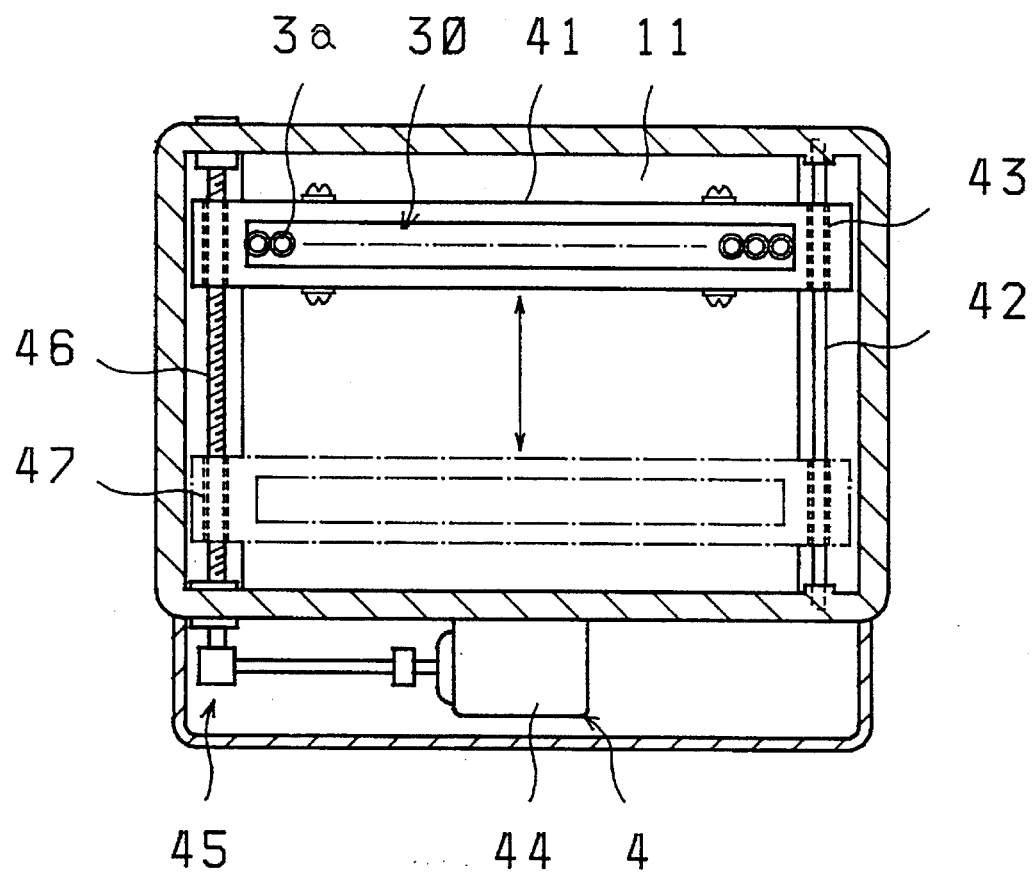
FIG. 3 is a cross sectional view of the detection unit moving device.
Figure 4:
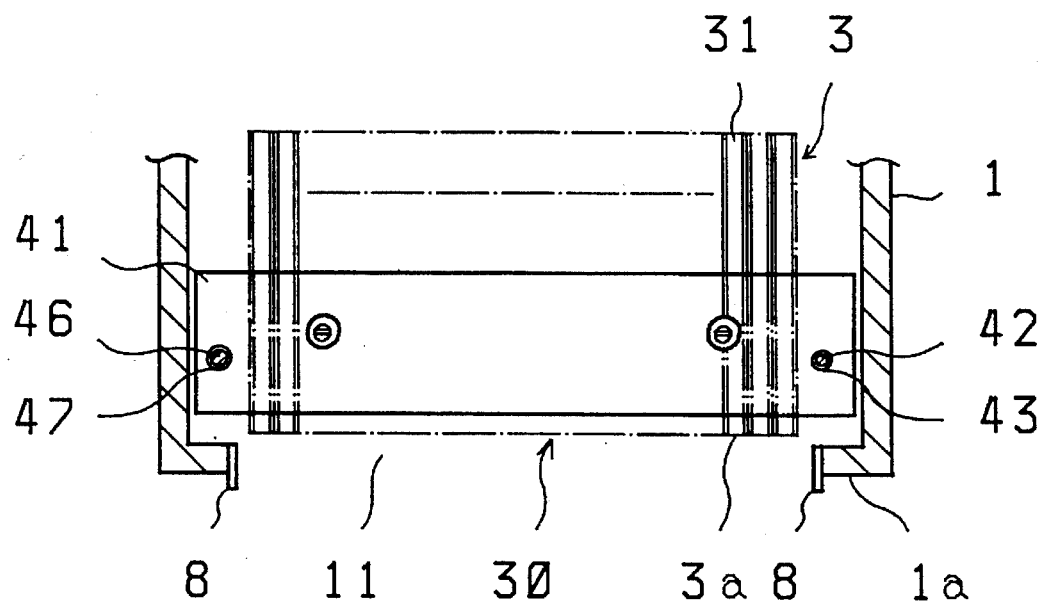
FIG. 4 is a longitudinal sectional view of a lower end portion of an optical fiber band cable and the detection unit moving device.

Numeral 3 is an optical fiber band cable, and multiple optical fibers 31 of a specified diameter are joined adjacently in vertical rows to form a band as shown in FIG. 3 and FIG. 4. As shown in FIG. 1, the upper end of each optical fiber 31 is connected to the sensor element 21 of the line sensor element unit 2, and the lower end 3a of each optical fiber 31 is set against the opening 11 of the bottom 1a of the case 1, and the optical fibers 31 are put in the case 1, and recording data is receiving from the lower end surface 3a of each optical fiber 31 consecutively adjacent in line, and detected by a line sensor detection unit 30.

As shown in FIG. 3, a detection unit moving device 4 is disposed so as to move the lower end surface 3a of the optical fiber band cable 3 of the line sensor detection unit 30, reciprocally parallel to the surface to be detected in an orthogonal direction of the optical fiber band cable 3, in the range of the opening 11 of the bottom 1a. As shown in FIGS. 1 through FIG. 4, the lower end surface 3a of each optical fiber 31 of the line sensor detection unit 30 is supported by a fiber support 41, a guide hole 43 in the fiber support 41 is fitted in the guide 42 of a guide shaft fixed at one side of the case 1, so that the lower end surface 3a of the optical cable 3 is free to move in the direction of the guide 42, that is, in the direction orthogonal to the optical fiber band cable 3. The interval of the optical fibers 31 is preferred to be about 1/1 to 1/5 of the interval of the mark elements (pixel marks of dots, etc.) composing the data in each data region of two-dimensional code, so that the presence or absence of data entering from the optical fibers 31 can be judged by the sensor elements 21 of the line sensor element unit 2, and be easily processed digitally.

As shown in FIG. 3, a screw shaft 46 is coupled to an transmitting mechanism 45 connected to a servo motor 44 incorporated in the case 1, a screw 47 penetrating into the fiber support 41 at the other end is screwed onto the screw shaft 46, and power feeding to the servo motor 44 is controlled by a control unit 7 (including batteries and controlling device) to rotate the servo motor 44 in normal direction at specified speed, and then rotate in reverse direction, thereby moving the line sensor detection unit 30 reciprocally in the case 1. The moving speed of the line sensor detection unit 30 can be raised to a high speed within an extent to be judged by the line sensor element unit 2, but, as required, the reading speed can be enhanced by maintaining at a specific low speed.

On the peripheral edge of the opening 11 of the bottom 1a of the case 1, a light emitting diode 8 is disposed as shown in FIG. 4, and the reading position and reading range of the reading device S are clarified, so that the reading apparatus S may be positioned accurately. Besides, if necessary, a transparent acrylic resin plate or the like may be disposed around the opening 11, so that the reading region may be visually seen.

In the embodiment, the guide shaft 42, guide hole 43, screw shaft 46, and screw 47 are disposed at one side of the line sensor detection unit 30, but they may be also utilized to decrease oscillation in moving of the fiber support 41 by being disposed in a vertical arrangement or on both sides. Other known driving means such as a magnetic actuator driven by an electromagnet may be used in place of the screw drive mechanism disclosed above.

Figure 2:
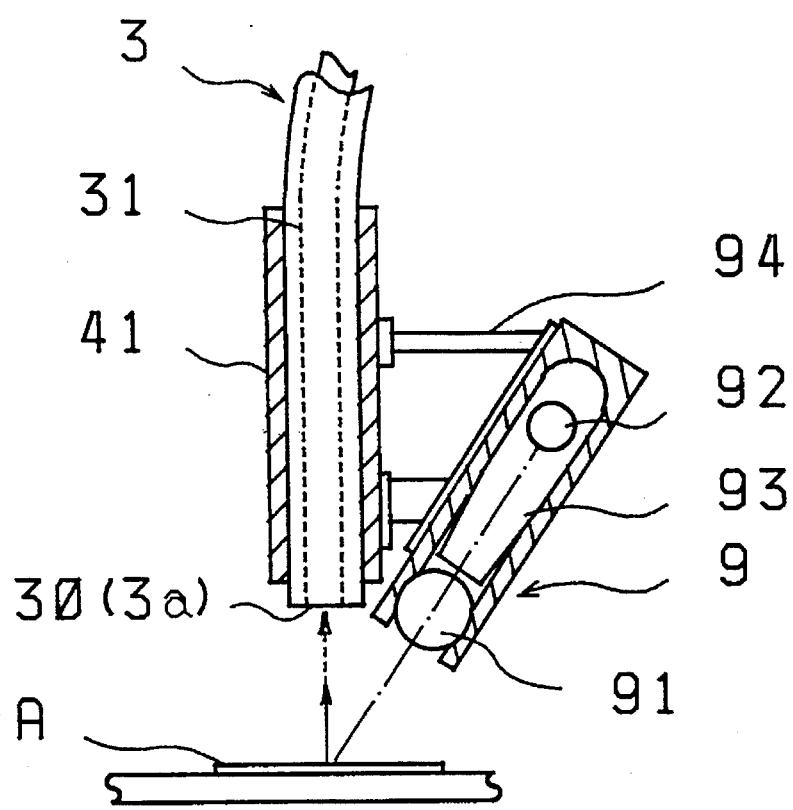
FIG. 2 is a longitudinal sectional view of a lighting device and a detection unit moving device.

As shown in FIG. 2, lighting device 9 is fixed to the fiber support 41 of the detection unit moving device 4 through a fixing element 94, opposite to the line sensor detection unit 30. By the detection unit moving device 4, the lighting device 9 is moved together with the lower end portion of the optical fiber 31, and the degree of illumination of the ray entering the lower end surface of the optical fiber 31 is set substantially constant across an entire range of the surface to be detected. In the embodiment illustrated in FIG. 2, the lighting device 9 includes a tubular light source (for example, a tubular discharge tube) 92 nearly equal to a width of the optical fiber band cable 3 or slightly wider and a tubular lens 91 in a light source case 93. As the light source 92, laser light, a light emitting diode, a lamp or the like may be used, and the wavelength is not particularly limited.

A handle 5 is projecting obliquely above the case 1 as shown in FIG. 1, to read the two-dimensional code data by manual operation, or instead of the handle 5, the upper part of the case 1 may be supported by a proper fixing member. Numeral 6 is an operation switch for manual type of input operation start, and the detection unit moving device 4 is controlled through the controlling device of the control unit 7, and the controlling device of the control unit 7 is designed to transmit the output of the line sensor element unit 2 to the outside by wire or by wireless.

In operation, the operator holds the handle 5 of the reading apparatus S in one hand, and the opening 11 of the bottom 1a of the reading apparatus S is brought close to the paper A recording two-dimensional code data glued on the merchandise or the like as shown in FIG. 1. This is same as data reading of a conventional one-dimensional code data such as no bar code. At this time, as shown in FIG. 4, from the light emitting diode 8 disposed on the peripheral edge of the opening 11 of the bottom 1a, the guide ray showing the reading range of the reading apparatus S is emitted, and one or more two-dimensional code data B on the paper A on which is recorded the two-dimensional code data of the surface to be detected glued on the merchandise can be easily positioned inside the opening 11, in the detection range of the line sensor detection unit 30.

When the detection unit moving device 4 is driven by pushing the operation switch 6, the lower end surface 3a of the optical fiber 31 of the line sensor detection unit 3 moves parallel at a specific speed on the paper A of the surface to be detected in the orthogonal direction to the line sensor detection unit 3. The two-dimensional code data B of the paper A recording the two-dimensional data is sequentially entered from $b_1$ to $b_2, b_3, \ldots, bn$ into the line sensor element unit 2 as shown in FIG. 5, and the two-dimensional image data of the memory of the reading apparatus S can be entered by using the line sensor for image detection of one-dimensional line, so that two-dimensional data can be read by one-dimensional line sensor.

Figure 5:
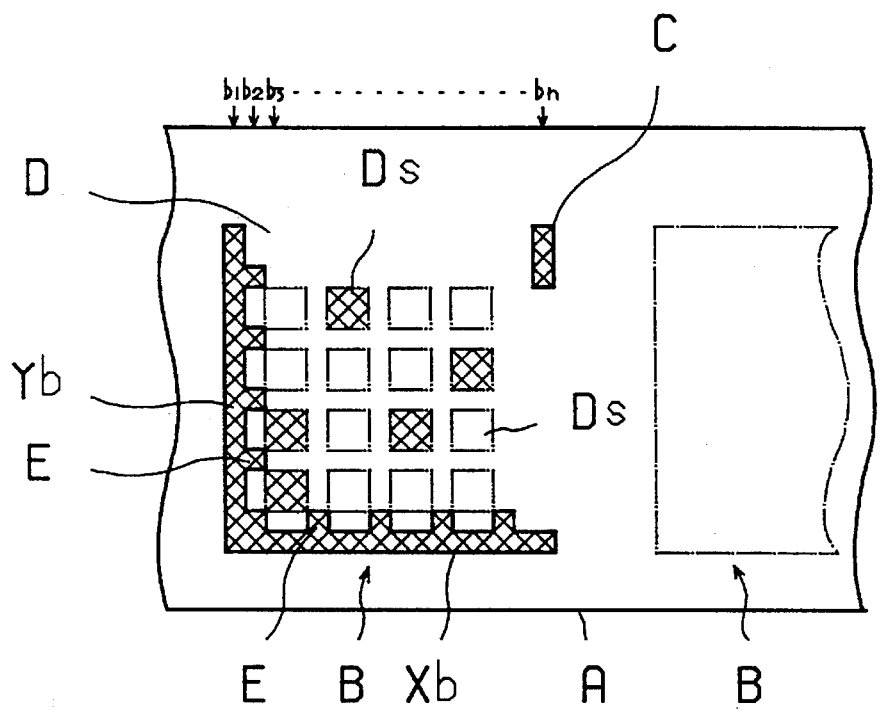
FIG. 5 is a partially cut-away plan of the surface of the paper to be detected on which two-dimensional code data is recorded.
Figure 6:
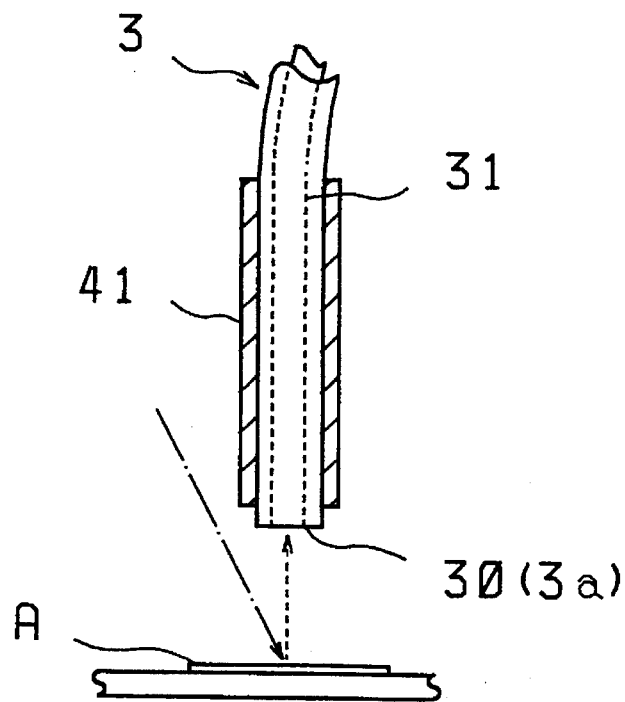
FIG. 6 is a longitudinal view similar to FIG. 2, except that the lighting device is omitted by making use of ambient room light.

The two-dimensional code of the embodiment is recorded in the data area D enclosed by X-axis reference line Xb, Y-axis reference line Yb, and corner mark C as shown in FIG. 5. As shown in the diagram, division marks E are provided at specific intervals in the X-axis reference line Xb and Y-axis reference line Yb, and binary codes (for example, black and white (blank) marks) may be entered in the small division area Ds enclosed by extending these division marks E, so that the two-dimensional code data can be recorded. The two-dimensional code is not limited to this embodiment alone, and it can be applied to other known matrix codes and stack bar codes, etc.

By omitting the lighting device 9 in the embodiment, the purpose of the invention can be achieved, and in this case, if the illumination of the paper A recording the two-dimensional code data on the surface to be detected is insufficient or varies, reading errors may occur, and hence room illumination for the surface to be detected must be considered.

Figure 7A:
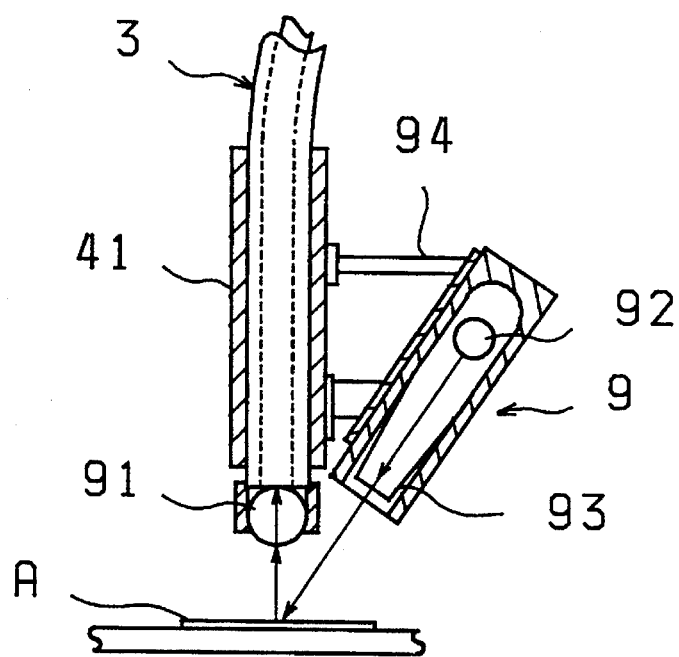
FIG. 7(a) is a longitudinal sectional view similar to FIG. 2, showing another embodiment of the lighting device, in which diagram a tubular lens acting on the lower end portion of the optical fiber band cable is utilized.
Figure 7B:
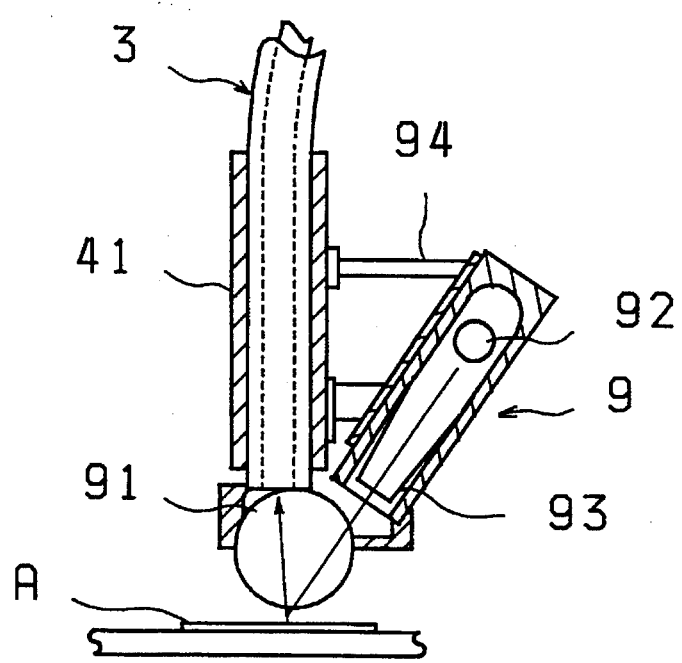
FIG. 7(b) is a longitudinal sectional view showing a lighting device and a tubular lens acting on the lower end portion of the optical fiber band cable.
Figure 8:
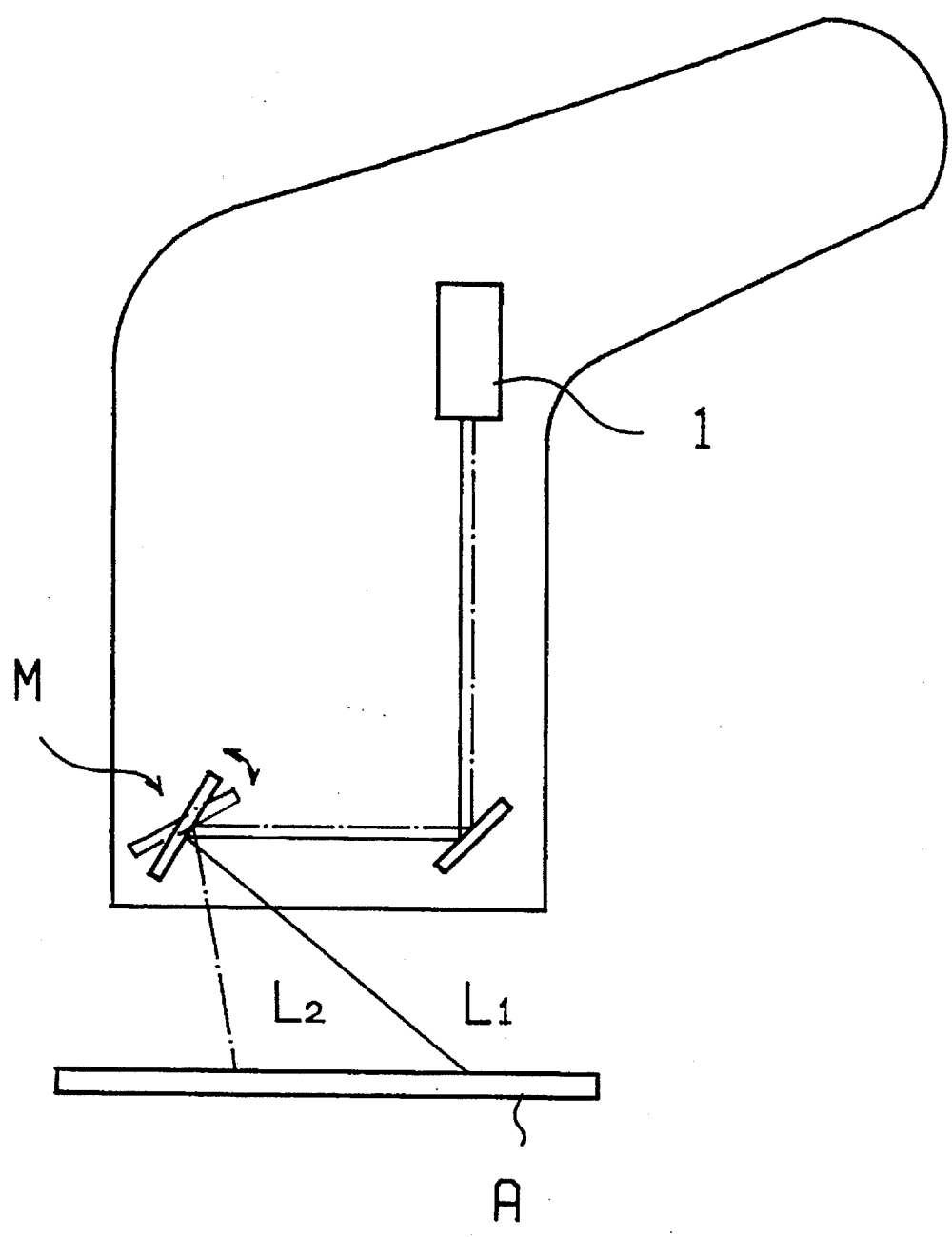
FIG. 8 is an explanatory diagram for optical error in a reading apparatus of two-dimensional code data using a movable mirror.

Moreover, by installing the tubular lens 91 in the ray path between the light source 92 of the lighting device 9 and the lover end surface 3a of the optical fiber 31 of the line sensor detection unit 3 as stated above, the intensity of the illumination ray entering the line sensor detection unit 3 can be heightened, but the position of the tubular lens 91 is not limited to the form to act on the illumination ray to the paper A on the surface to be detected by incorporating in the lighting device 9 as shown in FIG. 2, but as shown in FIGS. 7 (a), (b), it may be also disposed to act only on the reflected light from the paper A on the surface to be detected (FIG. 7(a)), or act on both the illuminating ray to the paper A on the surface to be detected and on the reflected ray from the paper A on the surface to be detected (FIG. 7(b)).

Various embodiments are presented about the invention, and other modifications and changes may be properly executed by those skilled in the art within the spirit and scope of the invention described herein.

Thus, in the invention, the end surface of the optical fiber band cable which is the line sensor detection unit is moved in the orthogonal direction, and two-dimensional code data is entered and read from the paper recording the two-dimensional code data, and the two-dimensional code data can be read by a simple mechanism of one-dimensional line sensor, and therefore the sensor device of two-dimensional code data can be simplified and the cost can be reduced, and data image processing can be done by a simple algorithm.

By moving the line sensor detection unit (end surface of the optical fiber band cable) disposed one-dimensionally by the detection unit moving device, the image can be read two-dimensionally, and the distance between the line sensor detection unit and the surface to be detected (the paper on which two-dimensional code data is recorded) can be always maintained constant, so that two-dimensional code data can be read precisely. Besides, as required, the moving speed of the line sensor detection unit can be maintained at a constant low speed, and the reading precision can be enhanced. Accordingly, it solves the problems in the conventional method of moving the reading position of the line sensor by optical means, or the laser ray method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable, hand-held reading apparatus for reading two-dimensional code data comprising:

line sensor detection means for reading the two-dimensional code data, said line sensor detection means including an optical fiber band cable having multiple optical fibers, one end of said multiple optical fibers being connected to a line sensor element unit and another end of said multiple optical fibers being disposed adjacent to an opening made in said reading apparatus;

detection unit moving means for moving said multiple optical fibers parallel along a surface to be detected in an orthogonal direction so as to move said line sensor detection means within a range of the opening and read the two-dimensional code data; and housing means, including a handle, for enclosing said line sensor detection means and said detection unit moving means.

2. The portable, hand-held reading apparatus of claim 1, where in the one end of said multiple optical fibers is fixed by a fiber support, fitted into a sliding guide, and said detection unit moving means is disposed so that said line sensor detection means moves reciprocally in the opening of the bottom of said portable, hand-held reading apparatus along the sliding guide.

3. The portable, hand-held reading apparatus of claim 1, further comprising:

lighting means, disposed opposite to the surface to be detected for illuminating the surface to be detected.

4. The portable, hand-held reading apparatus of claim 3, further comprising:

a lens in a ray path between said line sensor detection means and said lighting means.

5. The portable hand-held reading apparatus of claim 1, further comprising:

a light emitting diode disposed on a peripheral edge of the opening for indicating a reading position and a reading range of said portable, hand-held reading apparatus.

6. The portable hand-held reading apparatus of claim 1, wherein an interval between said multiple optical fibers is equal to an interval between mark elements composing the two-dimensional data divided by a specific number.

7. The portable, hand-held reading apparatus of claim 6, wherein the specific number is 1 to 5.

8. A method of reading a two-dimensional code data using a portable, hand-held recording apparatus comparing the steps of:

(a) reading the two-dimensional code data by moving one end of multiple optical fibers included in an optical fiber band cable adjacent, to an opening in said portable, hand-held reading apparatus; and (b) moving the multiple optical fibers parallel along a surface to be detected in an orthogonal direction within a range of the opening and detecting the two-dimensional code data using a line sensor detection unit.

9. The method of claim 8, further comprising the step of:

(c) fixing the lower end portion of the optical fiber band cable of the line sensor detection unit and moving the line sensor detection unit over the opening, to thereby read the two-dimensional code data sequentially.

10. The method of claim 8, wherein a lighting device is disposed in said portable, hand-held reading apparatus, and the surface to be detected by the line sensor detection unit is illuminated by the lighting device, and the two-dimensional code data is read sequentially.

11. The method of claim 10, wherein the line sensor detection unit is illuminated by the lighting device through a lens, and the two-dimensional code data is read by the line sensor detection unit.

12. The method of claim 8, wherein the reading position and reading range are indicated by the light emitting diode and, peripheral edge of the opening, and the reading apparatus is moved to the reading position, to thereby read the two-dimensional code data.

13. The method of claim 8, wherein an interval of optical fibers of the optical fiber band cable of the line sensor detection unit is equal to an interval of mark elements in a data region of the two-dimensional code divided by a specified number, and a presence or absence of the two-dimensional code at each optical fiber is determined, to thereby read the two-dimensional code data.

* * * * *